US010279815B2

(12) United States Patent
Burnette (10) Patent No.: US 10,279,815 B2
(45) Date of Patent: *May 7, 2019

(54) VEHICLE CONTROLS BASED ON THE MEASURED WEIGHT OF FREIGHT

(71) Applicant: Uber Technologies, Inc., San Francisco, CA (US)

(72) Inventor: Donald Burnette, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,659

(22) Filed: Aug. 1, 2018

(65) Prior Publication Data

US 2018/0339711 A1   Nov. 29, 2018

Related U.S. Application Data

(63) Continuation of application No. 15/385,613, filed on Dec. 20, 2016.

(51) Int. Cl.
  *B60W 10/06* (2006.01)
  *B60W 40/13* (2012.01)
  (Continued)

(52) U.S. Cl.
  CPC .......... *B60W 40/13* (2013.01); *B60W 10/06* (2013.01); *B60W 10/184* (2013.01); *G01G 19/02* (2013.01);
  (Continued)

(58) Field of Classification Search
  CPC .... B60W 40/13; B60W 10/06; B60W 10/184; B60W 2520/16; B60W 2530/10;
  (Continued)

(56) References Cited

U.S. PATENT DOCUMENTS

| 6,236,954 | B1 * | 5/2001 | Thomas | ................. B60T 8/172 |
| | | | | 702/142 |
| 9,031,746 | B2 * | 5/2015 | Kozuka | ............... B60T 8/17551 |
| | | | | 701/41 |

(Continued)

FOREIGN PATENT DOCUMENTS

| WO | WO2009/072965 | 6/2009 |
| WO | WO2010/144028 | 12/2010 |

OTHER PUBLICATIONS

Jeong et al., Vehicle sensor and actuator fault detection algorithm for automated vehicles, 2015, IEEE, p. 927-932 (Year: 2015).*

(Continued)

*Primary Examiner* — McDieunel Marc
(74) *Attorney, Agent, or Firm* — Dority & Manning, P.A.

(57) ABSTRACT

A vehicle can include throttle, braking, and steering systems. The vehicle can further include a computing system that obtains, from one or more sensors, data representing one or more of a velocity or an acceleration of the vehicle. The computing system can further determine an estimated weight of the vehicle based on the one or more of the velocity or the acceleration of the vehicle, and autonomously operate the throttle, braking, and steering systems of the vehicle based on the estimated weight of the vehicle.

20 Claims, 3 Drawing Sheets

(51) Int. Cl.
*G01G 19/02* (2006.01)
*G01G 23/36* (2006.01)
*B60W 10/184* (2012.01)

(52) U.S. Cl.
CPC .......... *G01G 19/022* (2013.01); *G01G 23/36* (2013.01); *B60W 2520/16* (2013.01); *B60W 2530/10* (2013.01); *B60W 2600/00* (2013.01); *G05D 2201/0213* (2013.01)

(58) Field of Classification Search
CPC ... B60W 2600/00; G01G 19/02; G01G 23/36; G05D 1/021
See application file for complete search history.

(56) References Cited

U.S. PATENT DOCUMENTS

| | | | | |
|---|---|---|---|---|
| 9,517,767 | B1* | 12/2016 | Kentley | B60N 2/002 |
| 9,630,619 | B1* | 4/2017 | Kentley | B60W 30/09 |
| 9,701,239 | B2* | 7/2017 | Kentley | B60N 2/002 |
| 9,804,599 | B2* | 10/2017 | Kentley-Klay | G05D 1/0088 |
| 9,868,332 | B2* | 1/2018 | Anderson | B60G 17/016 |
| 10,065,647 | B2* | 9/2018 | Tiwari | B60W 30/18163 |
| 2011/0248122 | A1* | 10/2011 | Schlipf | B64C 9/24 244/214 |
| 2015/0006034 | A1* | 1/2015 | Kozuka | B60T 8/17551 701/41 |
| 2015/0203117 | A1 | 7/2015 | Kelly et al. | |
| 2016/0016525 | A1* | 1/2016 | Chauncey | B60R 16/0236 701/123 |
| 2017/0136842 | A1* | 5/2017 | Anderson | B60G 17/016 |
| 2017/0369055 | A1* | 12/2017 | Saigusa | G08G 1/096791 |
| 2018/0154899 | A1* | 6/2018 | Tiwari | G08G 1/0112 |
| 2018/0162186 | A1* | 6/2018 | Anderson | B60G 17/016 |
| 2018/0170396 | A1* | 6/2018 | Burnette | B60W 40/13 |
| 2018/0211218 | A1* | 7/2018 | Berdinis | G06Q 10/08355 |

OTHER PUBLICATIONS

Liu et al., Combined Speed and Steering Control in High-Speed Autonomous Ground Vehicles for Obstacle Avoidance Using Model Predictive Control, 2017, IEEE, p. 8746-8763 (Year: 2017).*
Valls et al., Design of an Autonomous Racecar: Perception, State Estimation and System Integration, 2018, IEEE, p. 2048-2055 (Year: 2018).*
Drage et al., Integration of Drive by Wire with Navigation Control for a Driverless Electric Race Car, 2014, IEEE, p. 23-33 (Year: 2014).*
Chiang et al., Embedded Driver-Assistance System Using Multiple Sensors for Safe Overtaking Maneuver, 2014, IEEE, p. 681-698 (Year: 2014).*
Bertolazzi et al., Development of a Reduced Size Unmanned Car, 2008, IEEE, p. 763-770 (Year: 2008).*
Dias et al., Longitudinal Model Identification and Velocity Control of an Autonomous Car, 2014, IEEE, p. 776-786 (Year: 2014).*
ISR and Written Opinion issued in PCT/US2017/066447 dated May 24, 2018.

* cited by examiner

VEHICLE CONTROLS BASED ON THE MEASURED WEIGHT OF FREIGHT

CROSS-REFERENCE TO RELATED APPLICATION

This application is a continuation of U.S. patent application Ser. No. 15/385,613, titled "Vehicle Controls Based on the Measured Weight of Freight," and filed on Dec. 20, 2016; which priority application is hereby incorporated by reference in its entirety.

FIELD

The present application relates to systems and methods for measuring and accounting for the weight of a vehicle.

DESCRIPTION OF THE RELATED ART

A freight vehicle's weight can vary significantly with each shipment. For example, it is common for trucks to weigh as much as 80,000 pounds or have loads over 70,000 pounds, or weigh less than 35,000 pounds or less than 20,000 pounds without a trailer. For driving systems to accommodate both a full load and an empty load, the system must accommodate weights differing by factors roughly between two and four. Because acceleration during braking is directly proportional to mass (or weight), the resulting acceleration from a given braking pressure can also vary by factors roughly between two and four. A vehicle must be able to account for these differences.

Vehicle weight can be estimated based on a known weight of the truck and a reported weight of the freight. However, independent and reliable measurements of the weight can be helpful in various contexts, such as staying within government weight limits on public roads and confirming the characteristics of the freight.

SUMMARY

The present application interchangeably describes measurement of both the "weight" of the vehicle and the "mass" of the vehicle. Because the weight and mass are closely related in the context of this application, it should be understood that a measurement of the weight can be considered to be the same as a measurement of the mass unless there is a particular reason to distinguish the two.

In one embodiment, a method of adjusting an autonomous driving behavior or actuators of the vehicle according to a variable weight of the vehicle is provided. Kinematic data of the vehicle, including at least one of a velocity or an acceleration of the vehicle, can be measured at a time. This data can be processed to estimate a weight of the vehicle. The vehicle actuators (which can optionally control autonomous driving, semi-autonomous driving, or assisted-driving) can be adjusted based on the estimated weight of the vehicle. For example, desired accelerations and decelerations of the vehicle can translate to particular levels of throttle or brakes, depending on the total weight (or estimated weight) of the vehicle.

In another embodiment, a method of confirming a weight of freight carried by a vehicle is provided. A stated weight of freight to be carried by the vehicle can be received or determined from a source (for example, a third party, a customer, a carrier, etc.). Kinematic data of the vehicle, while carrying the freight at a time can be measured. Depending on variations, the kinematic data can include a velocity of the vehicle, the acceleration of the vehicle, and/or other measured data. The kinematic data from the time can be processed to estimate a weight of the vehicle. The estimated weight of the vehicle can be compared with the expected weight of the vehicle based on the stated weight of freight.

According to another example, a method of measuring and reporting a weight of freight carried by a vehicle is provided. Kinematic data of the vehicle, including at least one of a velocity or an acceleration of the vehicle, can be measured at a time. This data can be processed to estimate a weight of the vehicle. Data corresponding to the estimated weight can be transmitted from a first device to a second device external to or remote from the vehicle.

BRIEF DESCRIPTION OF THE DRAWINGS

These and other features, aspects, and advantages of the systems and methods disclosed herein are described below with reference to the drawings of preferred embodiments, which are intended to illustrate and not to limit the inventions. Additionally, from figure to figure, the same reference numerals have been used to designate the same components of the illustrated embodiments. The following is a brief description of each of the drawings.

DETAILED DESCRIPTION

Figure 1:
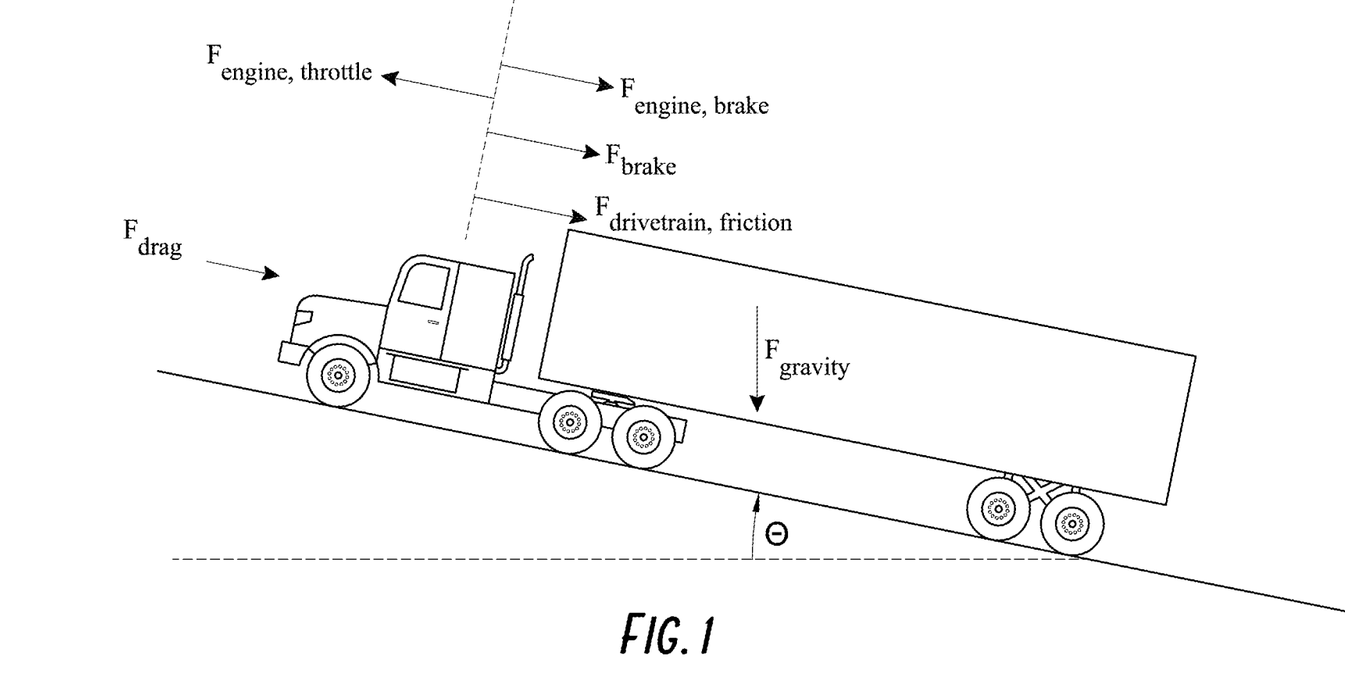
FIG. 1 depicts an embodiment freight vehicle and indicates various forces that can act on the freight vehicle.

FIG. 1 is an illustration of a side view of a freight vehicle depicted as a truck, although other types of vehicles are possible (e.g., a van, a sedan, a boat, or an airplane, etc.). The truck can be a tractor truck such as a semi-tractor, although other types of trucks are possible. Further, as shown, the truck can include a trailer configured to carry freight that can comprise a variety of objects, such as products, dry goods, fluids, or other types of freight. The trailer can be an integrated part of the truck, or alternatively, as shown, the trailer can be configured to be easily separated from the truck during routine use, such as with a fifth-wheel coupling. The trailer can potentially be rotatably coupled to the tractor, or it can be rotationally-fixed with the tractor.

Figure 2:
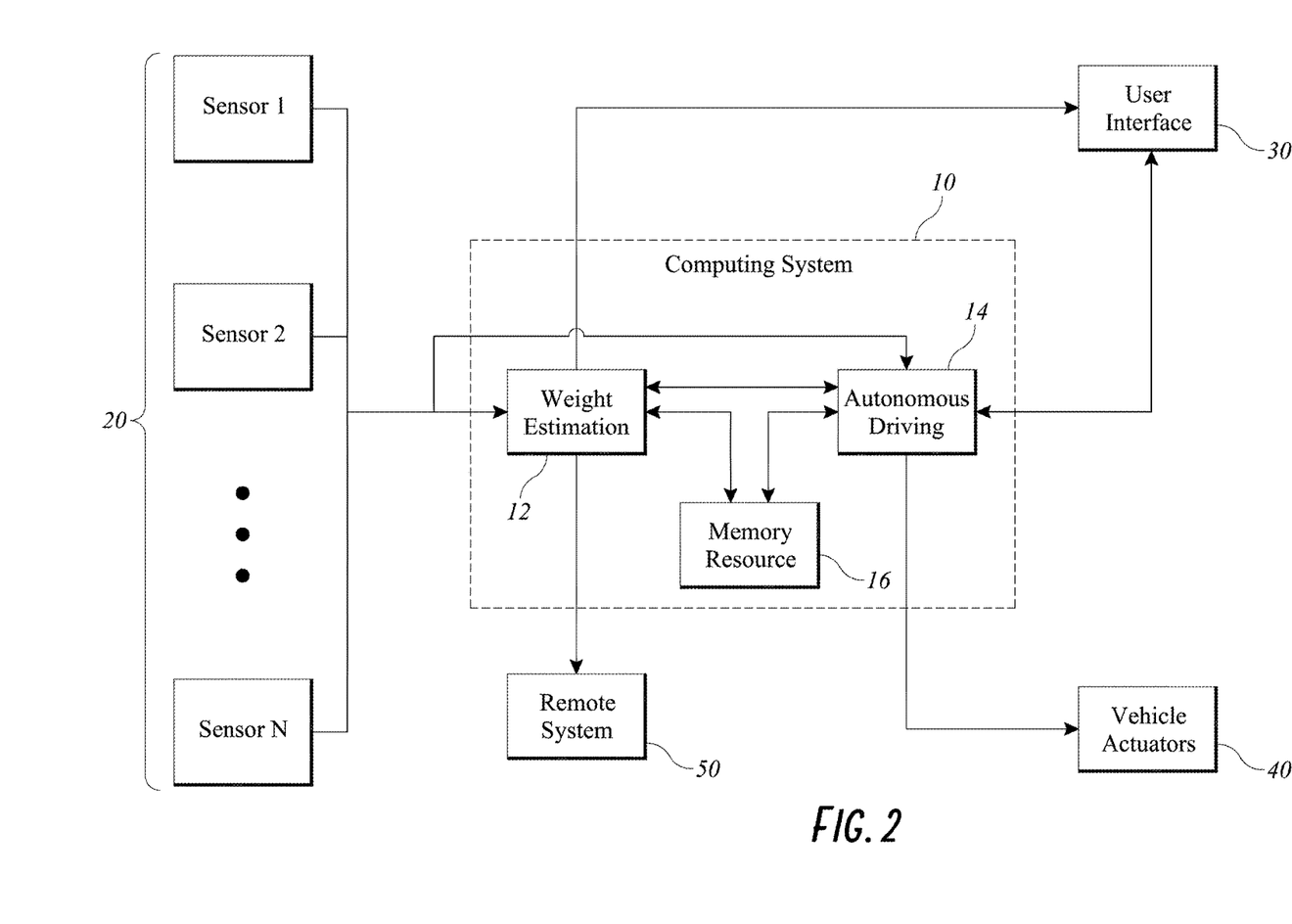
FIG. 2 is a block diagram of components of an embodiment freight vehicle system.

FIG. 2 is a block diagram illustrating components used with the freight vehicle, according to an example. The freight vehicle can include a computing system 10 that can be used to perform a variety of functions, including estimating a weight of the vehicle, controlling autonomous driving, recording and processing data received from various sensors 20 on the vehicle, providing data to a human inside the vehicle (in one example), and/or transmitting data to devices remote from the vehicle. The computing system 10 can be a dedicated and/or integral device on the vehicle, and/or can also be associated with or include accessory devices 60 such as an in-vehicle computing system, smartphone, laptop, or tablet device, that can perform functions described herein (including processing data to estimate a weight). The accessory devices 60 can communicate with the computing system 10 through wireless connections or wired connections (for example, through a dedicated or generic port).

The sensors 20 can be located on the vehicle to measure data regarding the vehicle, which can be used by the computing system, as further described herein. The data from the sensors can be transmitted to the computing system 10 using wired or wireless communication, and can then be used by a weight estimation module 12 that can process data from the sensors 20, as further described herein. The resulting weight estimates can be used by the computing system 10, such as by an autonomous driving module 14 that can control vehicle actuators 40 (such as the throttle, brakes, and steering) to drive the vehicle or otherwise modify non-autonomous driving of the vehicle. The computing system 10 can also communicate with one or more user interfaces 30 such as a display or speaker integral to the truck or computing system, or user interfaces in communication with the computing system through another device such as a smartphone or computer. The user interfaces 30 can report an estimated weight (or related information) to a user in the vehicle or remote from the vehicle, allow the user to modify the autonomous driving of the vehicle, or perform other functions. The computing system 10 can also communicate with remote systems 50 that can receive data including the estimated weight from the computing system or provide data to the computing system.

Referring back to FIG. 1, FIG. 1 also depicts various forces that can act upon the vehicle, such as a truck. For example, the truck can receive an accelerating or decelerating force from the engine of the truck or the brakes on the truck. The brakes can provide a decelerating force when activated, and the strength of the braking force can be estimated using a variety of sensors 20 on the vehicle. Measurements of air pressure or mechanical pressure applied to the vehicle's brakes can be made with sensors 20 located proximate to the brake actuators such as pressure gauges at one or more valves or tubes to indicate the strength of the braking force. Similarly, stress/strain or position sensors on or proximate to the brake pads can measure pressure or movement of the brake pads to indicate a strength of the braking force. Information related to the type and condition of the brake pads and other brake components can also be used to estimate the strength of the braking force.

The engine can provide an accelerating force when the throttle is activated and the drivetrain is engaged to convey power from the engine to the truck's wheels. The accelerating force from the engine can be estimated using sensors 20 on the vehicle in a manner similar to that with the brakes. For example, sensors 20 proximate to the engine or drivetrain can measure throttle position, fuel flow, engine revolutions, torque output at the engine or at other points along the drivetrain, or other measurements indicative of the accelerating force provided by the engine.

In some examples, the engine of the vehicle can also provide a decelerating force, such as with engine braking. Forces from engine braking can be estimated using data from similar sensors 20 as the throttle forces. Additionally, the estimated forces can be adjusted in view of the expected transfer of force between the vehicle and the road. For example, a vehicle with older tires or traveling in slippery road conditions might have less grip on the road. In some embodiments, the potential amount of slipping (e.g., as a result of old tires or slippery road conditions) can be adjusted for in the estimated force on the vehicle. In other embodiments, data collected during a period where slipping is detected (for example, based on a sudden increase in wheel revolutions without a corresponding increase in fuel or throttle, or a sudden decrease in wheel revolutions caused by only minimal braking) can be ignored.

As discussed above, the vehicle can experience a set of forces that can be controlled by adjusting actuators 40 on the vehicle such as the throttle, brakes, gears, and/or other components while driving. Thus, these forces can be independent of the state of a vehicle. For example, some of these forces can be summarized in Equation 1, below, indicating forces from the braking system, and forces from the engine (both throttle accelerations and engine braking decelerations).

$$F_{independent} = F_{engine,throttle} + F_{engine,brake} + F_{brake} \quad (1)$$

In addition to the independent and controllable forces on the vehicle, discussed above, the vehicle can also experience forces that cannot be easily adjusted while driving, and are instead dependent on a state of the vehicle, road, and/or environment (e.g., weather conditions, road gradient, etc.). For example, the vehicle can experience frictional losses in its drivetrain. Further, the vehicle's geometry and surface characteristics can cause drag. Other kinematic data such as the vehicle's pitch angle can also affect the force of gravity on the vehicle. In some embodiments, these forces can be modeled as a function of velocity and pitch angle. In one example, some of these state-dependent forces can be summarized in Equation 2, below.

$$F_{dependent} = F_{gravity} + F_{drivetrain\ friction} + F_{drag} \quad (2)$$

In another example, the state-dependent forces can further be estimated using Equations 3-5, below, where "e" is the pitch angle of the vehicle, "V" is the velocity of the vehicle, "m" is the mass of the vehicle, "g" is the acceleration of gravity, and $C_1$, $C_2$, and $C_3$ are constants.

$$F_{gravity} = m \cdot g \cdot \sin(\theta) \quad (3)$$

$$F_{drivetrain\ friction} = C_1 \cdot m \cdot g \cdot \cos(\theta) \quad (4)$$

$$F_{drag} = -C_2 \cdot V - C_3 \cdot V_2 \quad (5)$$

However, other estimates can also be made. For example, because $\cos(\theta)$ can be approximately constant for variations in the pitch angle near zero, and the vehicle's mass can be estimated on roads that are relatively flat, the estimated forces from drivetrain friction can be estimated according to equation 6, below.

$$F_{drivetrain\ friction} = -C_1 m \cdot g \quad (6)$$

It will be understood that other estimates of the forces can also be made, depending on the data available and the desired level of accuracy. Still further, according to examples, models that define or articulate the forces based on vehicle variables can be stored in a memory resource(s) 16 of the computing system (or in a remote memory resource accessible by the computing system) and accessed by the computing system 10 of the vehicle.

In order for the computing system 10 (and the weight estimation module 12) of the vehicle to determine an accurate estimate of the weight of the vehicle, in some examples, the computing system can reduce the influence of forces that are difficult to measure accurately. The state-independent forces, such as forces from the engine and/or brake can be removed by the computing system 10 by deactivating their respective actuators 40. Thus, the engine throttle, engine brake, and/or the vehicle's separate brake systems can optionally all be turned off to facilitate an accurate measurement of the vehicle's mass. In some embodiments, the forces from the engine may be more difficult to estimate than forces from the brake. Additionally, it may be unsafe or inefficient to completely disable the engine and brakes while driving and measuring with the sensors. Thus, in various examples, it can sometimes be preferable for the computing system 10 to measure the weight of the vehicle while only a brake is applied, while both the brakes and the engine (either throttle or engine brakes) are applied, and/or while neither of the brakes and engine are applied.

According to some examples, the computing system 10 can determine or estimate the force from the separate (non-engine) brakes using brake pressure, which can be measured using pressure sensors on the brake pads or other measurements within the brake's actuator system. The relationship between brake pressure and braking force can be estimated using experiments in an isolated setting, or using data from the vehicle's motion as further described below. Such data (which describes the brake pressure and braking force correlation) can be stored in a memory resource(s) 16 of the computing system 10 (or in a remote memory resource accessible by the computing system) and used by the computing system 10 to determine the force of the brakes based on the measured brake pressure. In another example, the relationship between brake pressure and braking force can further be estimated using data specific to the brake components used in the vehicle, such as the type of brakes, brand of brakes, wear-and-tear on the brakes, and/or other data.

Still further, in some examples, the computing system can determine or estimate the force from the engine throttle and/or engine brakes based on measured data from one or more sensors 20 of the vehicle. For example, the forces from the engine throttle can depend on the engine's revolutions per minute (RPM), torque output from the engine (or at other portions of the drivetrain), gears currently used by the vehicle, and/or other data. Data describing the association between forces from the engine throttle and RPM, torque output, etc., can also be stored in a memory resource(s) 16 and accessed by the computing system. Forces from the engine brakes can be estimated based on similar information.

To reduce errors in estimating the state-dependent forces, the computing system 10 can take measurements or cause measurements to be taken by vehicle components and/or sensors at favorable times. As indicated, the state-dependent forces can be dependent on the vehicle's pitch angle and velocity. Other variables could also be relevant, such as a vehicle's angle while making a turn (yaw), traction variations (such as on a slippery surface), and wind. To reduce the significance of unmodeled variables, according to an example, the computing system 10 can determine (e.g., periodically or at specified instances of time, etc.) the variables of the vehicle (e.g., pitch, yaw, and/or roll measurements, velocity and/or acceleration of the vehicle, environmental conditions, etc.), and based on the determined variables, determine when to measure or assess the various vehicle measurements (e.g., brake pressure, RPM, etc.). The measurements can be taken in preferable conditions for the vehicle, such as on a straight and/or flat section of road (no turns, or small or no gradient), under good road and/or environmental conditions (no rain, ice, gravel, or other causes for slipping), and/or no wind.

In some examples, if windy conditions cannot be avoided when taking measurements, the computing system 10 can use a model that accounts for wind, or adjust the models already in use (such as those embodied in the equations provided herein) to account for the wind. For example, if the computing system determines that accurate weather data is available (using sensors 20 on the vehicle or data received from external sources such as a weather news service) and/or detects that the wind speed is substantially consistent, then the computing system can adjust the drag force to account for the wind by increasing or decreasing the velocity-term (for example, "V" in Equation 5) according to the headwind or tailwind speed to indicate the wind speed experienced by the moving vehicle. Thus, a new variable "$V_{adj}$" can represent the velocity used to compute the force of drag in Equation 5, for example, after adjustment for wind velocity as indicated in Equation 7, below, with φ indicating the direction of the wind relative to the direction of the vehicle's movement.

$$V_{adj}=V_{vehicle}+V_{wind}\cdot\cos(\varphi) \quad (7)$$

In some embodiments, the vehicle can include a weather vane or other sensor 20 to measure wind direction, providing an indication of the direction of the wind (and thus an indication of φ). Alternatively, the measurements can be taken at different vehicle speeds and/or in different directions. If the other variables are known, the wind speed can be estimated based on the differences in accelerations experienced by the vehicle, as discussed further below.

As noted above, the $\cos(\theta)$ term in Equation 4 can be approximately constant for theta near zero. Thus, it can be desirable for the measurements to be taken when the road is substantially flat, such as being less than 15 degrees, less than 10 degrees, or less than 5 degrees, where the $\cos(\theta)$ term can be treated as being equal to 1. In one example, in applying Equation 3, the computing system 10 of the vehicle can measure the pitch angle theta using sensors 20 such as one or more inertial measurement units ("IMUs") that can include any of accelerometers, gyroscopes, compasses, and/or other indicators to determine the vehicle's movement, direction, and/or acceleration. An accelerometer can indicate the direction of gravity, allowing the pitch angle to be measured relative to gravity. However, this indication of the direction of gravity can be unreliable when other accelerations are present. A gyroscope can measure changes in angle, which can also indicate the pitch angle, although gyroscopes' indication of an absolute angle can drift overtime, such that they are most useful for indicating a recent change in angle. A compass, indicating magnetic north, can also indicate an angular orientation when the vehicle's position is known (such as with a Global Positioning System device). Other sensors 20 or combination of sensors can also be used to indicate the pitch angle.

The computing system 10 can determine the velocity of the vehicle using sensors 20 such as a speedometer and/or sensors associated with the drive train. For example, an angular encoder can measure rotations of the wheels, which can be used to determine the distance traveled by the vehicle in a specific time frame. The number of rotations per unit time can thus be used to determine velocity. Velocity can also be determined using other sensors 20 such as a Global Positioning System device and the movement of stationary objects relative to the vehicle.

The computing system 10 can also determine the acceleration of the vehicle to determine the weight, according to some examples. In one example, acceleration can be measured using sensors 20 such as accelerometers, differentiating the measurements of the velocity discussed above, or using other techniques. To reduce errors in the measurement of the velocity or the acceleration, the computing system can take measurements while the vehicle is moving at a substantially constant speed (zero acceleration) or at a substantially constant acceleration. Measurements from an accelerometer can become noisy if acceleration changes rapidly. Further, noise in velocity measurements can be amplified when differentiated to estimate acceleration. Thus, acceleration and velocity can be kept sufficiently constant to reduce the noise in these signals.

The total forces on the vehicle can relate to the acceleration of the vehicle according to Equation 8, below, where "a" is the acceleration of the vehicle.

$$F = m \cdot a \tag{8}$$

The force "F" can be the sum of the forces indicated above. To simplify the analysis in the following equations, the mass is determined in a situation without wind, where the pitch angle is sufficiently close to zero such that $\cos(\theta)$ is approximately 1, no engine forces are present, and there are no other adverse conditions that would alter the analysis as discussed above. Thus, the model embodied in the equations described above can yield the following:

$$F = m \cdot a = F_{independent} + F_{dependent} \tag{9}$$

$$m \cdot a = F_{brake} + F_{gravity} + F_{drivetrain\ friction} + F_{drag} \tag{10}$$

$$m \cdot a = F_{brake} + m \cdot g \cdot \sin(\theta) - C_1 \cdot m \cdot g - C_2 \cdot V - C_3 \cdot V^2 \tag{11}$$

Solving for the mass, "m", yields Equation 12, below.

$$m = (-C_2 \cdot V - C_3 \cdot V^2 + F_{brake})/(a + (C_1 - \sin(\theta))g) \tag{12}$$

The computing system 10 can use an example Equation 12, in one embodiment, to determine or estimate the mass of the vehicle based on the measured variables. The data for the variables in Equation 12 can be noisy. Thus, according to some examples, the computing system 10 can compute the variables at multiple times to determine multiple measurements of the mass of the vehicle, and then average these measurements in one or more ways to estimate the true mass of the vehicle. In some embodiments a simple average can be used. In other embodiments, the variance of each variable can be estimated and used to compute a modified average.

As discussed above, sometimes it might not be possible to avoid taking measurements in the presence of wind. If the wind speed and direction cannot be measured sufficiently accurately with direct measurements or be received from external sources, it can be determined using methods similar to those used to determine the mass. For example, the computing system 10 can use a modified version of Equation 11 based on Equation 7 to account for both the velocity of the vehicle and the velocity of the wind relative to the vehicle. In the case where the vehicle's direction does not change the $\cos(\varphi)$ term can be ignored. With multiple measurements of the other variables in Equation 11 at different speeds, various best fit techniques can be used to simultaneously estimate the vehicle's mass and the strength of the wind. If the vehicle changes direction, then the wind direction can also be determined simultaneously in the same way. Multiple variables can be simultaneously estimated using best fit techniques such as nonlinear regression and iterated nonlinear least squares. Further modifications to the estimation of these variables can also be used.

Notably, the constants $C_1$, $C_2$, and $C_3$ are assumed to be known in the equations described above. Depending on implementation, the constants can be determined in various ways and stored in the memory resource 16 of the computing system 10. With sufficient data from the sensors 20, the constants can be estimated in a similar way that the vehicle's mass and the environmental wind conditions are measured. However, they can often be determined more accurately. For example, a vehicle can be tested under substantially consistent conditions such as while having a known mass (for example, measured on a scale), while on a flat surface, while on a level surface (or a surface with a known angle), with substantially no wind, with no engine forces, with no braking forces, and without any other conditions that might add error to the estimates. Any combination of these factors can be used to facilitate the determination of the constants. While testing, measurements can be taken and those measurements can be used to estimate the constants using methods similar to those described above.

The constants can also be determined for specific types of vehicles. For example, a specific model of truck having a specific profile can have consistent known drag-related constants for all trucks of that model. Thus, the corresponding constants can be determined for all trucks of that model without testing each truck individually. Similarly, constants related to friction in the drivetrain can also be potentially consistent for all vehicles having the same drivetrain components, or the same components with the same level of wear-and-tear. Similar methods can also be used to estimate the relationship between brake pressure and braking forces.

The methods described herein can be implemented on a computing system 10 located on the vehicle or off the vehicle. The computing system 10 can include one or more processors, one or more memories, and one or more communication mechanisms. In some embodiments, more than one computer can be used to execute the modules, methods, and processes discussed herein (including the weight estimation module 12 and the autonomous driving module 14). Additionally, the modules, methods, and processes described herein can each run on one or more processors, on one or more computers; or the modules described herein can run on dedicated hardware. One or more of the components used can also be combined into a single unit or module. In some embodiments, all of the electronic components are included in a single physical unit or module. The computing system 10 can also potentially perform other functions, such as providing autonomous driving functionality to the vehicle, allowing communications with an operator of the vehicle (such as with a video screen or speakers), allowing communications with external devices through wireless communications, or provide other functions.

The computing system 10 of the vehicle can receive sensor data from the plurality of sensors 20 while the vehicle is in operation (e.g., moving, driving via human control, driving autonomously or semi-autonomously, etc.), and use that data to determine and/or verify the mass of the vehicle (e.g., periodically, at a predetermined scheduled time, in response to user input or other trigger, etc.). This information can then be used for a variety of purposes.

For example, autonomous driving systems (optionally implemented by the computing system) can use this information to adjust how the vehicle is driven. For example, the system may determine that it will need to stop prior to reaching a nearby barrier. The system will then need to determine how strongly to apply the vehicle's brakes to stop prior to reaching the barrier. How strongly the brakes are applied can be based on an expected response from the vehicle, which can rely on factors such as the characteristics of the brake pads and the weight of the vehicle. A vehicle's brake pads (or other components of the vehicle) can be substantially constant from trip-to-trip, to the extent they affect the braking characteristics of the vehicle. However, as noted above, the weight of the vehicle can vary significantly. The weight of the vehicle can also be used without autonomous driving, such as with semi-autonomous features such as brake-assist systems and cruise control.

Monitoring vehicle weight can also be important for other considerations. For example, a weight of the freight (with a known relationship to the weight of the vehicle) stated by a third party can be compared with an estimated weight of the freight to indicate if there is a discrepancy. Alerts can be provided to an operator of the vehicle or autonomous driving of the vehicle can be terminated, for example, if the mass appears to have changed, possibly indicating damage to the vehicle, lost cargo, or some other problem. According to one example, such alerts can be presented (e.g., as a user interface feature or notification) on a user interface 30 associated with the computing system 10 of the vehicle or another user interface of an accessory device used by the operator (e.g., a smartphone in communication with the computing system). In another example, an alert or message can be transmitted to a remote system 50 that is in communication with the computing system 10 of the vehicle. The remote system 50 can monitor or manage the operation of the vehicle, in one example, and can provide control signals to control one or more vehicle sub-systems.

Information about the mass of the vehicle can also optionally be automatically electronically transmitted to remote systems 50 that are third party systems. For example, the information can be provided to an owner of the vehicle, the supplier of the shipment or cargo, or an insurer of the vehicle to provide an indication of the cargo carried by the vehicle. The information can also be provided to a governmental authority to confirm that the vehicle is within weight restrictions for the roads being traveled by the vehicle. The ability to measure mass while driving can allow the vehicle to avoid weighing on scales before or after a trip, or avoid stopping at a weigh station.

Figure 3:
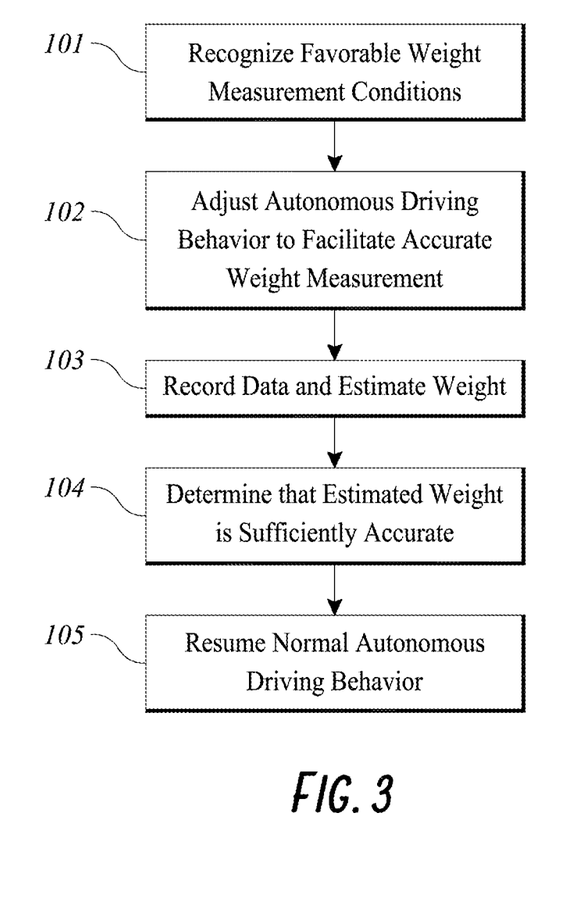
FIG. 3 depicts an embodiment method for measuring a weight of a freight vehicle.

To facilitate accurate measurements of the weight of the vehicle, an autonomous driving module 14 can optionally adjust driving of the vehicle at a particular time such that sufficiently accurate measurements of the weight of the vehicle can be obtained, as depicted in FIG. 3. For example, the autonomous driving module 14 can use sensors 20 to recognize that road and environmental conditions are favorable for accurate measurements of the vehicle's weight (step 101). The autonomous driving module 14 can then adjust driving behavior (when safe) to reduce or eliminate other difficult to measure variables such as forces from the engine (step 102). For example, the computing system 10 can record data from the sensors 20 during motion without inputs from the engine or the brakes, and then use additional data from the sensors while applying the brakes. Data from the sensors 20 can be recorded and used by the computing system 10 to estimate a weight of the vehicle (step 103). The computing system 10 can continue until a sufficiently accurate measurement of the vehicle's weight has been determined (step 104), and can then return to normal driving behavior (step 105).

Similar methods can also be used in non-autonomous driving or semi-autonomous driving. For example, data from the sensors 20 can be recorded at anytime (including during autonomous driving) even if the conditions are not favorable for accurate measurements. This data can then be used in a similar manner to provide estimated weights. Although these measurements might have more error, large amounts of data can still yield a relatively accurate estimate. To the extent driving is being controlled by a human, the human driver can be prompted by the computing system 10 (through a user interface 30) to adjust their driving to facilitate accurate measurements of weight (including releasing the throttle and/or the brakes). Similarly, in the context of autonomous driving, a human user can use a user interface 30 to prompt the computing system 10 to adjust driving behavior for favorable measurements, and measure the weight at that time to produce an on-demand weight estimate.

Many other variations on the methods and systems described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various algorithm steps described in connection with the embodiments disclosed herein can be implemented as electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative steps described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor can also include primarily analog components. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art that can serve as a memory resource 16. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A vehicle comprising:
   throttle, braking, and steering systems;
   a computing system comprising one or more processors executing software, causing the computing system to:
   obtain, from one or more sensors, data representing one or more of a velocity or an acceleration of the vehicle;
   based on the one or more of the velocity or the acceleration of the vehicle, determine an estimated weight of freight carried by a trailer of the vehicle; and
   autonomously operate the throttle, braking, and steering systems of the vehicle based on the estimated weight of the freight.

2. The vehicle of claim 1, wherein the one or more sensors comprise one or more brake actuator sensors of the braking system, and wherein the executed software causes the computing system to obtain the data from the one or more brake actuator sensors while the braking system is engaged.

3. The vehicle of claim 1, wherein the one or more sensors comprise one or more brake pressure sensors of the braking system, and wherein the executed software causes the computing system to obtain the data from the one or more brake pressure sensors while the braking system is engaged.

4. The vehicle of claim 1, wherein the one or more sensors comprise a throttle position sensor, and wherein the executed software causes the computing system to obtain the data from the throttle position sensor while the throttle system is engaged.

5. The vehicle of claim 1, wherein the braking system comprises an engine braking system, and wherein the executed software causes the computing system to obtain the data while the engine braking system is engaged.

6. The vehicle of claim 1, wherein the one or more sensors comprise a fuel flow sensor.

7. The vehicle of claim 1, wherein the executed software causes the computing system to obtain the data by measuring an engine throttle force on the vehicle while the throttle system is engaged.

8. The vehicle of claim 1, wherein the executed software causes the computing system to deactivate the braking system on the vehicle while obtaining the data.

9. The vehicle of claim 1, wherein the executed software causes the computing system to deactivate an engine of the vehicle while obtaining the data.

10. The vehicle of claim 1, wherein the executed software further causes the computing system to:
    determine a pitch angle of the vehicle;
    wherein the executed software causes the computing system to further determine the estimated weight of the freight based at least in part on the pitch angle.

11. The vehicle of claim 1, wherein the executed software further causes to computing system to:
    determine a drag force on the vehicle;
    wherein the executed software causes the computing system to determine the estimated weight of the freight by accounting for the drag force on the vehicle.

12. The vehicle of claim 11, wherein the executed software causes the computing system to determine the drag force on the vehicle by accounting for current wind conditions.

13. The vehicle of claim 1, wherein the executed software further causes the computing system to:
    determine frictional losses in a drivetrain of the vehicle;
    wherein the executed software causes the computing system to determine the estimated weight of the freight by accounting for the frictional losses in the drivetrain.

14. The vehicle of claim 1, wherein the executed software further causes the computing system to:
    electronically transmit the estimated weight of the freight to a computing device remote from the vehicle.

15. The vehicle of claim 1, wherein the executed software further causes the computing system to:
    based on the obtained data from the one or more sensors, repeatedly determine the at least one of the velocity or the acceleration of the vehicle;
    repeatedly determine the estimated weight of the freight; and
    adjust autonomous operation of the throttle, braking, and steering systems based on each repeatedly determined estimated weight of the freight.

16. The vehicle of claim 1, wherein the executed software further causes the computing system to:
    receive a stated weight of the freight to be carried by the trailer; and
    compare the stated weight with the estimated weight.

17. The vehicle of claim 16, wherein the executed software further causes the computing system to:
    terminate autonomous operation of the throttle, braking, and steering systems of the vehicle if the estimated weight of the freight differs from the stated weight of the freight.

18. The vehicle of claim 16, wherein the executed software further causes the computing system to:
    transmit the estimated weight of the freight to a computing device remote from the vehicle if the estimated weight of the freight is substantially different from the stated weight of the freight.

19. A non-transitory computer-readable medium storing computer executable software that, when executed by one or more processors of a vehicle, causes the one or more processors to:

obtain, from one or more sensors of the vehicle, data representing one or more of a velocity or an acceleration of the vehicle;

based on the one or more of the velocity or the acceleration of the vehicle, determine an estimated weight of freight carried by a trailer of the vehicle; and autonomously operate throttle, braking, and steering systems of the vehicle based on the estimated weight of the freight.

20. A computing system for a vehicle comprising:

a memory storing software; and one or more processors executing the software, causing the computing system to:
   obtain, from one or more sensors of the vehicle, data representing one or more of a velocity or an acceleration of the vehicle;
   based on the one or more of the velocity or the acceleration of the vehicle, determine an estimated weight of freight being carried by a trailer of the vehicle; and
   autonomously operate throttle, braking, and steering systems of the vehicle based on the estimated weight of the freight.

\* \* \* \* \*